UNITED STATES PATENT OFFICE.

GEORGE M. RICE, 2D, AND ALFRED L. RICE, OF WORCESTER, MASS.

IMPROVEMENT IN SEPARATING ANIMAL FROM VEGETABLE FIBERS.

Specification forming part of Letters Patent No. 205,139, dated June 18, 1878; application filed April 18, 1878.

*To all whom it may concern:*

Be it known that we, GEORGE M. RICE, 2d, and ALFRED L. RICE, of Worcester, in the county of Worcester and State of Massachusetts, have invented certain new and useful Improvements in the Art of Separating Animal Fibers from Vegetable Fibers; and we declare the following to be a description of our said invention sufficiently full, clear, and exact to enable others skilled in the art to which it appertains to make and use the same.

Our invention is based upon the discovery that chlorine, (Cl,) in its simple uncombined state, and under certain conditions as to temperature, exposure, &c., possesses in a very marked degree the property of chemically acting to destroy or decompose vegetable fibers, while upon animal fibers exposed under similar conditions it has no apparent injurious or decomposing effect; and our invention consists in the practical application of the above principle in the art of separating animal fibers from vegetable fibers, as in the separation of wool from cotton in waste or rags, and in other similar industrial purposes, by subjecting, treating, or exposing the mixed fibrous material to the action in direct contact of free chlorine, (Cl,) either in pure gaseous form or diluted with a substance for which it has no chemical affinity, and to a temperature suited to quickly develop the required effect, as more fully hereinafter set forth.

We do not desire to confine our invention to the exact mechanical manipulations hereinafter expressed, or to the use of any particular kind of apparatus, as different forms of mechanism may be employed, whereby mixed animal and vegetable fibers may be brought into direct contact with uncombined chlorine (Cl) for successfully carrying out the improved process of separation without departure from the essential spirit of our invention.

In this specification we describe our invention as employed for cleansing or separating wool from cotton fibers in waste or rags, with a view to preserving the wool for reworking into new goods; but it will be understood that the process claimed is equally applicable for the separation of other animal fibers from vegetable fibers employed in other classes of goods.

The following description explains the nature of our improved process, and the best manner now known to us for practically working the same in the separation of animal from vegetable fiber in waste or rags composed of mixed cotton and wool stock.

The material to be treated, in its ordinary dry condition, is placed within a close vessel or receiver, of suitable form and capacity to contain the desired quantity, in a loose mass. This receiver is charged with chlorine gas, (Cl,) or chlorine gas and air, either before or after the introduction of the material, and the mouth of the receiver closed or sealed to prevent the gas from escaping. Heat is then applied to increase the temperature of the mass to a degree suited to the quick development of the required effect, the temperature being raised as rapidly as convenient. This temperature may be stated at from 200° Fahrenheit to 350° Fahrenheit, or according to the density of the material, light open material requiring a less degree of heat than close heavy material.

The mass is held at the high degree of temperature from three to ten minutes, more or less, and is then in suitable condition to be withdrawn from the receiver, the decomposition of the vegetable fibers having been effected, while the animal fibers are left intact.

During the heating operation the contents of the receiver should be mechanically agitated by revolving the receiver or otherwise, to enable the chlorine gas to penetrate and act upon all of the fibers, and to give to the entire mass a uniform degree of temperature.

After removing the material from the receiver, a slight rubbing, shaking, or beating of the mass disintegrates the remaining portions of vegetable matter which may be blown or shaken from the mass in the form of a fine dust, while the animal fiber or wool is left in a suitable condition to be reworked on the waste-pickers or other wool-working machines in ordinary use, the elasticity, color, and glossiness of the wool remaining unaffected, or substantially the same as before subjection to the chlorine treatment.

The entire length of time required for the carrying out of this process of separation is some thirty minutes, more or less, according to convenience of apparatus and quantity treated.

The chlorine gas may be obtained or generated by the usual method in which such gas is prepared for use in the arts.

The chlorine gas (Cl) may be used in diluted condition by mixture with air, if desired, in order to avoid a waste of gas, the quantities or proportions of the chlorine and air being variable in accordance with the nature of the material treated. The chlorine being free in the mixture, the process and effect are substantially the same as with pure chlorine gas, and the dilution may be extended to seventy-five per cent. or eighty-five per cent. of air without detriment in the result when very open light-weight material is treated.

Among the advantages incident to our invention may be mentioned its extreme cheapness, the short time required for effecting the separation, the slight labor involved, and the fact that the material is worked dry, requiring no extra drying-room or drying apparatus, as well as the superior condition of wool after treatment.

We are aware that processes have heretofore been employed for separating animal fibers from vegetable fibers, wherein the vegetable fibers are incinerated or destroyed by the use of chemical agents, and for which purpose sulphuric acid, hydrochloric acid, chromic acid, and the chlorides of zinc, calcium, and aluminum have been employed, all of which are of chemically different nature from ours, and we make no claim to such modes of treatment; but

What we claim as new and of our invention, and desire to secure by Letters Patent, is—

1. The improvement in the art of separating animal fibers from vegetable fibers, consisting essentially in subjecting the mixed fibrous material within a closed vessel or receiver, and in dry condition, to the direct action of chemically free chlorine, (Cl,) either in its pure gaseous form or diluted with air, for which it has no chemical affinity, as set forth.

2. The improvement in the art of separating animal fibers from vegetable fibers, consisting in the process of exposing mixed fibrous material within a closed vessel or receiver, and in dry condition, in direct contact with chemically free chlorine, (Cl,) and subjecting the same to an elevated temperature, substantially as and for the purposes hereinbefore set forth.

Witness our hands this 13th day of April, A. D. 1878.

GEO. M. RICE, 2D.
ALFRED L. RICE.

Witnesses:
CHAS. H. BURLEIGH,
GEO. M. RICE.